US006938176B1

(12) United States Patent
Alben et al.

(10) Patent No.: US 6,938,176 B1
(45) Date of Patent: Aug. 30, 2005

(54) METHOD AND APPARATUS FOR POWER MANAGEMENT OF GRAPHICS PROCESSORS AND SUBSYSTEMS THAT ALLOW THE SUBSYSTEMS TO RESPOND TO ACCESSES WHEN SUBSYSTEMS ARE IDLE

(75) Inventors: Jonah Alben, San Jose, CA (US); Dennis Kd Ma, Sunnyvale, CA (US); Brian Kelleher, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 619 days.

(21) Appl. No.: 09/972,414

(22) Filed: Oct. 5, 2001

(51) Int. Cl.[7] .............................. G06F 1/26; G06F 1/28; G06F 1/32
(52) U.S. Cl. ....................... 713/323; 713/300; 713/320; 713/322; 713/324
(58) Field of Search ............................... 713/300, 320, 713/322, 323, 324, 500, 600

(56) References Cited

U.S. PATENT DOCUMENTS

| 5,446,840 A | * | 8/1995 | Kiuchi et al. ................ 345/545 |
| 5,585,745 A | * | 12/1996 | Simmons et al. .............. 326/93 |
| 5,623,647 A | * | 4/1997 | Maitra ......................... 713/501 |

(Continued)

OTHER PUBLICATIONS

Williams, Martyn "*S3 Launches New Graphics Chip,*" http://www.infoworld.com/articles/hn/xml/01/03/15/010315hnsavage.xml, pp. 1–3 (downloaded from Internet on Sep. 4, 2001).

Hagedoorn, Hilbert "*S3 Graphics Interview,*" http://guru3d.com/cgi–bin/newspro/ktalk/985098441, 10442, shtml, pp. 1–5 (downloaded from Internet on Nov. 16, 2001).

Transmeta Corporation, "*LongRun™ Power Management Technology,*" Transmeta Corporation. Crusoe™—The Technology—The Architecture—http://www.transmeta.com/technology/architecture/longrun.html, pp. 1–3 (downloaded from Internet on Jul. 25, 2001).

"*ATI's Rage LT Pro™ Gives the SCENIC Mobile 800 Notebook by Siemens Nixdorf Industry Leading 2D/3D and Video Acceleration,*" Press Releases, ATI Technologies Inc., http://www.ati.com/na/pages/corporate/press/1998/4093.html, pp. 1–3 (downloaded from Internet on Jul. 25, 2001).

Lakshminarayana, Ganesh, et al., "*A Power Management Methodology for High–Level Synthesis,*" In the *Proceedings of the International Conference on VLSI Design*, pp. 24–29, Jan. 1998, http://citeseer.nj.nec.com/lakshminarayana98power.html.

*Primary Examiner*—Lynne H. Browne
*Assistant Examiner*—James K. Trujillo
(74) *Attorney, Agent, or Firm*—Moser Patterson & Sheridan LLP

(57) ABSTRACT

A graphics processing device implementing a set of techniques for power management, preferably at both a subsystem level and a device level, and preferably including peak power management, a system including a graphics processing device that implements such a set of techniques for power management, and the power management methods performed by such a device or system. In preferred embodiments, the device includes at least two subsystems and hardware mechanisms that automatically seek the lowest power state for the device that does not impact performance of the device or of a system that includes the device. Preferably, the device includes a control unit operable in any selected one of multiple power management modes, and system software can intervene to cause the control unit to operate in any of these modes.

47 Claims, 1 Drawing Sheet

U.S. PATENT DOCUMENTS 5,719,800 A * 2/1998 Mittal et al. .................. 713/321
5,727,208 A * 3/1998 Brown ........................ 713/100
5,940,785 A * 8/1999 Georgiou et al. ............ 713/322
5,996,083 A * 11/1999 Gupta et al. ................. 713/322
6,141,762 A * 10/2000 Nicol et al. .................. 713/300
6,216,235 B1 * 4/2001 Thomas et al. ............. 713/501
6,600,575 B1 * 7/2003 Kohara ........................ 358/406
6,691,236 B1 * 2/2004 Atkinson ..................... 713/320

* cited by examiner

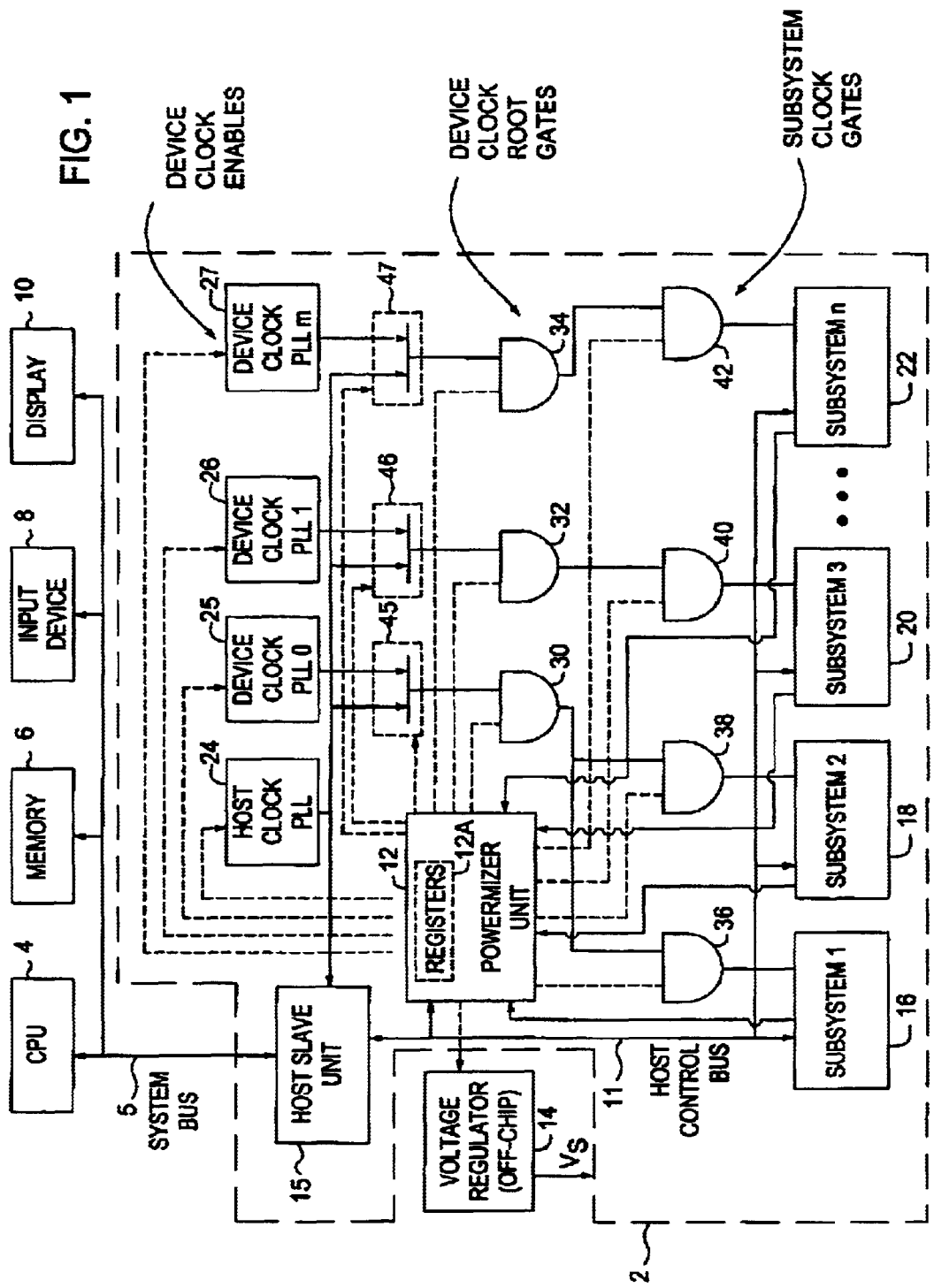

METHOD AND APPARATUS FOR POWER MANAGEMENT OF GRAPHICS PROCESSORS AND SUBSYSTEMS THAT ALLOW THE SUBSYSTEMS TO RESPOND TO ACCESSES WHEN SUBSYSTEMS ARE IDLE

TECHNICAL FIELD OF THE INVENTION

The present invention relates to methods and apparatus for power management of graphics chips (graphics processors implemented as integrated circuits), graphics cores (portions of graphics chips), and systems including graphics processors.

BACKGROUND OF THE INVENTION

Typically, most of the power consumed by a graphics processor ("GPU") while it renders video data for display is consumed as a result of the toggling of clocks within the GPU.

Conventional methods for power management of processing circuitry (e.g., CPUs and graphics processing circuitry) include placing the processing circuitry in a state in which it consumes low power when it is idle, placing a circuit block of the processing circuitry in a state in which it consumes low power when it is idle, and controlling at least one voltage asserted to the processing circuitry and the frequency of at least one clock used by the processing circuitry to reduce power consumption.

Each of the following terms is used throughout the specification, including in the claims, in the following sense:

"system" denotes a computer system, for example a desktop, laptop, or handheld computer, that connects to a host slave unit (defined below) of a device (defined below). A system typically comprises at least a CPU, a GPU, a memory, at least one input device, and a display device (e.g., a liquid crystal display or other flat panel display, or cathode ray tube monitor);

"device" denotes a graphics processor chip (or a graphics processing portion of a chip, sometimes referred to as a graphics "core" or "core portion") that includes a host slave unit (defined below) and at least one subsystem (defined below) configured to be connected to a system through the host slave unit. A device also includes one or more device clocks (defined below), one or more subsystem clocks (defined below), and a host clock (defined below);

"subsystem" denotes a block of logic, the registers for which are physically related by a common subsystem clock (defined below);

"host slave unit" denotes a block of logic that responds to slave accesses to a device that are initiated by a system. A PCI slave interface implementation is an example of a host slave unit;

"system bus" denotes an interconnect between a device and other elements of a system that includes the device. An AGP bus is an example of a system bus;

"host control bus" denotes an interconnect (within a device) between the host slave unit and each subsystem of the device. The device employs this interconnect to respond to host slave unit accesses directed towards a subsystem;

"host register" denotes any register accessible via a host control bus. For example, a status register that can be read by system software to determine the state of a subsystem is a host register. To avoid system hangs inadvertently caused by system software, host registers must always be responsive to host accesses;

"non-host register" denotes any register other than a host register. For example, the pipeline registers in the data-path of a typical device, and the state registers in a typical state machine of a device, are generally non-host registers;

"subsystem power management" denotes the discipline of managing power within an individual subsystem of a device;

"device power management" denotes the discipline of managing power globally across a device, rather than at the individual subsystem level;

"peak power management" denotes the discipline of managing the peak power of a device so as to reduce its thermal design point (defined below) to match system design limitations;

"thermal design point" denotes the maximum allowable power dissipation for a device. It is a parameter used by system designers to determine strategies for removing heat;

"device clock" denotes a device-level clock generated by circuitry (e.g., a PLL) internal to a device, or a device-level clock generated externally to a device and asserted to a pin of the device. In preferred embodiments of the invention, each device clock of a device is responsive to device clock controls described herein;

"host clock" denotes the clock that controls a host slave unit. In preferred embodiments of the invention, each host clock of a device is responsive to host clock controls described herein; and "subsystem clock" denotes a separately controllable branch of a device clock that terminates at a subsystem. Circuitry of the subsystem operates in response to the subsystem clock. In preferred embodiments of the invention, each subsystem clock of a device is responsive to subsystem clock controls described herein.

SUMMARY OF THE INVENTION

In a class of embodiments, the invention is a graphics processing device (an integrated circuit or portion of an integrated circuit) implementing a set of techniques for power management, preferably at both a subsystem level and a device level, and preferably including peak power management. Other aspects of the invention are a system including a graphics processing device that implements such a set of techniques for power management, and the power management methods themselves.

In preferred embodiments of the invention, hardware mechanisms automatically seek the lowest power state for the device that does not impact performance of the device or performance of a system that includes the device. Preferably, the hardware mechanisms disable generation of clocks that are not used by non-idle subsystems and prevent assertion of clocks to idle subsystems. In preferred embodiments of the inventive system, system software intervenes (to determine the power management mode of a graphics processing device) in cases in which the device does not have sufficient information to seek the most appropriate power state, and cases in which a user wishes to override the automatic mechanisms. For example, the system software can be implemented to give a user direct control over power management decisions from a dialog box of a displayed control panel. The user can use the control panel to override automatic mechanisms and choose a high-performance device state (with high power consumption) when playing a game to improve the user's graphics experience at the expense of power consumption. In response, system software must intervene to communicate the user's decision to the device.

The invention addresses six areas of power management: subsystem power management, device power management, peak power management, frame rate management, display interface frequency management, and backlight intensity management.

Subsystem power management focuses on individual subsystems of a graphics processing device, such as a graphics subsystem or an MPEG subsystem. Hardware mechanisms in the device automatically disable generation of clocks that are not used by non-idle subsystems and prevent assertion of clocks to idle subsystems, and optionally also perform other subsystem power management operations. In some implementations, external control of subsystem power management is sometimes necessary (e.g., when the automatic hardware mechanisms do not have sufficient information to seek the most appropriate power state, or when a user wishes to override the automatic mechanisms).

Device power management controls power consumption by a device at levels of broader scope than individual subsystems, such as by disabling generation of a device clock, preventing assertion of a device clock to any circuitry of the device, controlling device clock frequencies, and controlling voltage regulators employed to provide power to the entire device. Preferably, device power management is controlled by an entity (e.g., system software) external to the device, e.g., in response to changes in a system's pattern of using the device or in response to a system-level change in power state such as a change to battery use from A/C power use.

Peak power management is preferably implemented entirely by automatic hardware mechanisms of a device in accordance with the invention. Peak power management in accordance with the invention is designed to artificially limit the peak power drawn by a device to a pre-determined thermal design point by dynamically lowering clock frequencies and/or voltage when power consumption exceeds a threshold (preferably so as to optimize for real applications rather than contrived applications).

In accordance with frame rate management, a graphics processing device is configured to operate in a frame generation mode in which it generates frames of image data at a selected frame rate, where the selected frame rate is a selected one of a set of predetermined frame rates. Preferably, the predetermined frame rates include a maximum frame rate and a reduced frame rate, the device generates pixels of the image data at a first pixel rate when operating in the frame generation mode with the selected frame rate equal to the maximum frame rate, and the device generates pixels of the image data at the first pixel rate but with idle time between generation of at least two subsets of the pixels (e.g., between lines, blocks of lines, fields, or frames of the image data) when operating in the frame generation mode with the selected frame rate equal to the reduced frame rate.

In accordance with display interface frequency management, a system (including a graphics processing device and a liquid crystal display) is configured to operate in at least two modes: a mode in which the display is refreshed (by asserting a frame of image data to the display) at a normal rate, Rn (e.g., Rn=60 frames per second); and a second mode in which the display is updated at a reduced rate Rr (e.g., Rr=40 frames per second). It is especially desirable to implement the system with this capability where the cells of the display require a minimum time, T, to change state, where T is greater than $(Rn)^{-1}$ but less than $(Rr)^{-1}$.

In accordance with backlight intensity management, a system (including a graphics processing device and a backlit display) is configured to drive the display's backlight with any of at least two predetermined duty cycles (and preferably with any of a large number of predetermined duty cycles). The power consumption of the backlight (as well as the time-averaged brightness of the light emitted thereby) is reduced by reducing the duty cycle of the signal that provided power thereto.

An important benefit of the invention is reduction of power consumption within mobile computing systems, and the invention is also applicable to desktop systems seeking to manage peak power requirements. In preferred embodiments, the inventive device is operable in any selected one of several power management modes, and includes a register interface to which an external processor can write control bits to select among these modes.

BRIEF DESCRIPTION OF THE DRAWING

FIG. 1 is a block diagram of a system including a graphics processing device. The system embodies the invention and is programmed (and otherwise configured) to execute a video game (or other graphics application) in which the device generates image data for display by another component of the system.

DETAILED DESCRIPTION OF THE PREFERRED EMBODIMENTS

With reference to FIG. 1, we describe a system that embodies the invention and that includes an embodiment of the inventive device (device 2 of FIG. 1). Device 2 of FIG. 1 is a graphics chip (or graphics "core" portion of a chip) coupled via system bus 5 to a computer system including CPU 4, memory input device 8, and display device 10. Device 2 is also coupled to external voltage regulator 14 which supplies power to device 2, by asserting supply voltage $V_s$ across relevant portions of device 2. The connection between device and voltage regulator 14's output is shown in a simplified manner in FIG. 1, to simplify the diagram.

The components of device 2 include host slave unit 15, host control bus host clock PLL 24 (which generates a host clock, and asserts the host clock to unit 15 and each of a set of multiplexers including multiplexers 45, 46, and 47), device clock PLLs (including PLLs 25, 26, 27, each of which generates a different device clock and asserts the device clock to one of the multiplexers), subsystem clocks (including the subsystem clock asserted to one input of AND gate 36, the subsystem clock asserted to one input of AND gate 38, the subsystem clock asserted to one input of AND gate 40, and the subsystem clock asserted to one input of AND gate 42), subsystems (including subsystems 16, 18, 20, and 22), and control unit 12, connected as shown. The number of device clocks, subsystem clocks, and subsystems, and the relationships between the device clocks and subsystems is implementation-specific. Subsystems 16, 18, 20, and 22 include at least one graphics subsystem and an MPEG subsystem.

Host slave unit 15 (which can be an AGP interface) is the interface between system bus 5 and host control bus 11, and thus between subsystems 16, 18, 20, and 22 (connected along host control bus 11) and CPU 4. The subsystems (including subsystems 16, 18, 20, and 22) can be defined with very coarse granularity (e.g., subsystem 16 can be an entire 3D image data processing pipeline), or with finer granularity (e.g., subsystem 16 can be a setup unit within a 3D image data processing pipeline, and subsystem 18 can be another subsystem of the pipeline).

Host slave unit 15 uses host control bus 11 to access subsystem registers (within the subsystems) in response to slave transactions initiated by CPU 4. These slave transactions are always allowed to complete successfully, regardless of the state of the power management control registers of the relevant one (or ones) of the subsystems. In other words, a clock must be provided for each subsystem even when the subsystem's device clock (the device clock determining the subsystem's subsystem clock) has been disabled to reduce power consumption, if necessary to implement a slave transaction. In one embodiment, this is accomplished as follows using multiplexers 45, 46, and 47. The host clock generated by PLL 24 (which controls host slave unit 15) is asserted to one input of each of multiplexers 45, 46, and 47. In response to one or more control signals asserted by control unit 12, multiplexer 45 selects the host clock (and deselects the output of PLL 25) when control unit 12 disables PLL 25, multiplexer 46 selects the host clock (and deselects the output of PLL 26) when control unit 12 disables PLL 26, and multiplexer 47 selects the host clock (and deselects the output of PLL 27) when control unit 12 disables PLL 27. Control unit 12 also asserts the appropriate control bits to AND gates 30, 32, 34, 36, 38, 40, and 42 to ensure that each of subsystems receives receive a toggling clock (either the host clock, or a subsystem clock determined by the output of one of PLLs 25, 26, and 27) so that each of the subsystems can respond to host slave transactions even when device 2 is in a reduced-power state (with one or more of PLLs 25, 26, and 27 disabled).

At least one subsystem clock determined by each of the device clocks generated by circuits 25, 26, and 27 is asserted to each of at least one of the subsystems. Specifically, a first subsystem clock (determined by the device clock output from PLL 25) is asserted through multiplexer 45, AND gate 30, and AND gate 36 to subsystem 16, a second subsystem clock (also determined by the device clock output from PLL 25) is asserted through multiplexer 45, AND gate 30, and AND gate 38 to subsystem 18, a third device clock (determined by the device clock output from PLL 26) is asserted through multiplexer 46, AND gate 32, and AND gate 40 to subsystem 20, and a fourth device clock (determined by the device clock output from PLL 27) is asserted through multiplexer 47, AND gate 34, and AND gate 42 to subsystem 22.

Each branch of a device clock tree that can be separately disabled by control unit 12 (and the clock asserted through such branch) is referred to as a subsystem clock. For example, the first subsystem clock is asserted through the branch from AND gate 30 through AND gate 36 to subsystem 16, and the second subsystem clock is asserted through the branch from AND gate 30 through AND gate 38 to subsystem 18. Circuitry within subsystem 16 operates in response to the first subsystem clock, and circuitry within subsystem 18 operates in response to the second subsystem clock. Control unit 12 asserts a control signal (indicative of a logical zero) to AND gate 36 and another control signal (indicative of a logical one) to AND gate 38 to enable the second subsystem clock and disable the first subsystem clock. In general, one or more subsystem clocks control each subsystem. Subsystem clocks are typically not shared by subsystems, although it is contemplated that they are so shared in some embodiments of the invention.

Control unit 12 can also assert a control signal (indicative of a logical one or zero) to each of AND gates 30, 32, and 34 to enable or disable each device clock (in the sense of allowing each device clock to be asserted, or preventing each device clock from being asserted, to the relevant subsystem or subsystems). For example, unit 12 asserts a control signal (indicative of a logical one) to AND gate 30 and control signals (indicative of logical zeroes) to AND gates 32 and 40 to enable one device clock (the device clock generated by PLL 25) and disable the device clocks generated by PLLs 26 and 27. Control unit 12 can also assert a control signal to each of the clock generation PLLs (e.g., PLL 24, PLL 25, PLL 26, and PLL 27) to enable or disable generation of each device clock. Power consumption by subsystems 16 and 18 (and thus by device 2) would decrease in response to assertion of a control signal indicative of a logical zero to AND gate 30 (although PLL 25 would continue to consume power in this case while it continues to generate a device clock), and power consumption by device 2 could then be further decreased by asserting another control signal (from control unit 12) to PLL 25 to cause PLL 25 to cease generation of a device clock.

In operation of device 2, each of the subsystems (including subsystems 16, 18 20, and 22) asserts a status signal to control unit 12. For example, each status signal is a single bit indicative of whether the subsystem is or is not idle. In one mode of operation, control unit 12 asserts control signals to elements 24–27, 30, 32, 34, 36, 38, 40, and 42 in response to the status signals. For example, control unit 12 can be implemented to respond (when operating in this mode) to a status signal indicating that subsystem 22 is idle by asserting to PLL 27 a control signal causing PLL 27 to cease generation of a device clock for subsystem 22. For another example, control unit 12 can be implemented to respond (when operating in this mode) to status signals indicating that only subsystem 16 is idle, by asserting a control signal indicative of a logical zero to AND gate 36, asserting control signals indicative of logical ones to the other AND gates, and allowing all of PLLs 24–27 to generate clocks.

As described above, a primary function of control unit 12 is to control the clock distribution circuitry of device 2. For illustrative purposes, FIG. 1 shows a simplified clock distribution scheme (levels of buffering are omitted for simplicity); however, the clock hierarchy is accurately represented. Control unit is configured to control each device clock tree at any or all of three levels in the hierarchy- at the device clock's origin (e.g., PLL 25, PLL 26, or PLL 27), at the root of the tree (e.g., at AND gate 30, 32, or 34), and at each branch of the tree that controls a subsystem (e.g., at AND gate 36, 38, 40, or 42). In addition to controlling the distribution and generation of device 2's clocks, control unit controls external voltage regulator 14 to determine the supply voltage applied across device 2 by regulator 14. Control unit 12 is preferably implemented to support multiple set points (i.e., supply voltages) for voltage regulator 14. In typical implementations, control unit 12 asserts control signals to voltage regulator 14 (to determine different ones of the set points) in response to control signals asserted from CPU 4 to control unit 12 (in response to commands entered by user manipulation of input device 8) via system bus 5 and host slave unit 15. Thus, the user can cause the system software to implement a user-specified trade-off between device performance and power consumption.

Consistent with the definition set forth above, the term "subsystem" is used herein to denote a block of physically related circuitry, the registers (and other clocked circuitry) of which are physically resident on the same controllable branch of a clock tree, such that assertion of the clock to the subsystem can be disabled in its entirety without affecting assertion of clocks to other circuitry of the device (circuitry other than the subsystem). While it is necessary only that the circuitry of each subsystem is physically related by the clock tree, it is common and convenient for the circuitry of each subsystem to be logically related as well.

The vast majority of the power consumed by a typical graphics processor is consumed as a consequence of the toggling of clocks. The FIG. 1 embodiment of the invention independently manages power consumption by each of its subsystems by matching each clock's operation with the necessity for its operation. Thus, if a subsystem is idle and thus does not require a clock to toggle its circuitry, assertion of the clock is disabled to reduce power consumption.

To determine the necessity for generating and asserting each clock of device 2, it is necessary to consider the two classes of registers that rely on these clocks: host registers and non-host registers. A typical subsystem of device 2 contains both host and non-host registers. Host registers are accessible via host slave unit 15 and host control bus 11 as a consequence of slave accesses to device 2 by CPU 4. Host registers are used for configuration management and are accessed relatively infrequently. Non-host registers are not accessible via a host slave unit 15. Non-host registers of a subsystem are used during the subsystem's normal operation rather than for configuration management, and typically have a much higher access frequency than host registers.

In order to avoid requiring system software to query the power management state of device 2 before accessing a host register within any of the subsystems of device 2, preferred embodiments of the invention require each subsystem to respond properly to slave accesses (by CPU 4, via host slave unit and host control bus 11) regardless of the power management state of the subsystem and of device 2. Since response to each such access typically requires that the target subsystem operate in response to a clock, device 2 is configured to provide an appropriate clock to the target subsystem even when device 2 is in a reduced-power state in which a subsystem clock is not asserted to the target subsystem. This can be accomplished (as described above) by configuring control unit 12 to cause multiplexers (e.g., multiplexers 45, 46, and 47 of FIG. 1) and other logic circuitry (e.g., relevant ones of AND gates 30, 32, 34, 36, 38, 40, and 42) to assert a host clock (e.g., the host clock generated by host clock PLL 24) to each subsystem at times when no subsystem clock is asserted to the subsystem. In variations on the described implementation, when the system requires that a target subsystem respond to a slave access at a time when the subsystem clock (for the target subsystem) has been disabled, control unit 12 causes temporary assertion of the host clock (or the subsystem clock for the target subsystem) to the target subsystem but only for a limited time as necessary to allow a proper response to the slave access.

Preferably, control unit 12 can be configured by CPU 4 (programmed with system software) to operate in any selected one of a number of different power management modes for controlling power consumption for each subsystem. For example, in a class of embodiments, register array 12A of control unit 12 (or other circuitry of device 2 that is accessible by control unit 12) includes a two-bit host register (called a "PM_SUBSYSTEM_CONTROL" register) for each of subsystems 16, 18, 20, and 22. System software can write a two-bit word to each "PM_SUBSYSTEM_CONTROL" register to indicate the power management mode for the corresponding subsystem. For convenience, the PM_SUBSYSTEM_CONTROL registers for all the subsystems can be aggregated into a physically contiguous array of registers or a single larger register (e.g., a 32-bit register of array 12A, when device 2 includes fifteen or sixteen subsystems). Control unit 12 decodes the two-bit word in each PM_SUBSYSTEM_CONTROL register as follows:

| Value | Name of Mode | Definition of Mode |
|---|---|---|
| 0 | FULLPOWER | No power management is performed on the subsystem. FULLPOWER mode would typically be used only for device characterization and would typically not be used during normal device operation. AUTOMATIC mode would generally be used during normal device operation. FULLPOWER is typically the default setting for each subsystem. |
| 1 | AUTOMATIC | Control unit 12 automatically performs power management on the subsystem with no system software intervention. The subsystem's subsystem clocks are disabled automatically when doing so will not affect the proper behavior or performance of the subsystem. Access to host registers is unaffected. |
| 2 | SUSPENDED | All of the subsystem's subsystem clocks are disabled. Access to host registers is unaffected. |
| 3 | RESERVED | Results are undefined. System software should not use this value. |

Preferably, each subsystem is designed so as to be operable efficiently when controlled in the AUTOMATIC mode in an efficient manner, so that system software never needs to require that it be controlled in the SUSPENDED mode. The SUSPENDED mode is a concession that this goal may not always be achievable. So that system software can determine whether it must be involved in the subsystem's power management (by triggering SUSPENDED mode control of the subsystem at appropriate times), the system software must be aware of the quality of each subsystem's operation in response to AUTOMATIC mode control.

We next describe in more detail the device-level power management techniques employed by preferred implementations of the FIG. 1 system. The inventive device-level power management techniques fall into six categories: device clock management, host clock management, dynamic core voltage (and device clock frequency) management, frame rate management, display interface frequency management, and backlight intensity management.

We first consider frame rate management, which is both a device-level power management technique and a system-level power management technique. The power consumed by the inventive device (e.g., device 2) and a system including the inventive device (e.g., the FIG. 1 system) can be controlled by limiting the frame rate (the rate at which the device renders frames of video data and outputs the rendered frames for display). In accordance with the invention, a device (and a system including the device) are implemented to operate at a frame rate selected by a user (using hardware or software control) from a number of available frame rates (the number being greater than one). For example, in cases in which device 2 of FIG. 1 is a graphics processor configurable via driver software (assuming CPU 4 and device 2 are programmed with such driver software) implementing the D3D or OpenGL application programming interface (or other application programming interface), the driver software is implemented in accordance with the invention to include a user interface that allows a user to select one of several frame rates. In response, both CPU 4 and graphics processor ("GPU") 2 of the system operate at the frame rate selected by the user. By selecting a lower frame rate, the user causes the GPU and CPU to consume less power during operation than they would if the user had selected operation at a higher frame rate. Preferably, the user interface allows the user to select operation at an arbitrary number of frames per second (within some predetermined range), or at any of a set of predetermined frame rates (e.g., at any of 120, 40, and 30 fps, or either of 120 and 40 fps, or either of and 30 fps). In cases in which the system is a battery-powered notebook computer, and the user selects a frame rate at which the system will execute a game program, the invention would allow the user to postpone the recharging or replacement of the battery while also specifying a playable frame rate.

Consider an implementation of the FIG. 1 system that is programmed and otherwise configured to run a game program at a maximum frame rate of 120 frames per second ("fps"). During operation at the maximum frame rate, graphics processor ("GPU") 2 and CPU 4 would consume maximum power to render frames at the rate of 120 fps and cause the frames to be displayed on display device 10. Preferably, CPU 4 and GPU 2 are programmed in accordance with the invention with driver software allowing a user to enter a command (by manipulating input device 8) that causes CPU 4 and GPU 2 to run the game program at a maximum frame rate of 60 fps (or 30 fps or 40 fps), and thus to consume less than the maximum power while running the game program. For example, the driver software can cause CPU 4 and GPU 2 to respond to the command by entering a mode in which GPU 2 generates (and asserts to display device 10) lines of video data (and the pixels in each line) at the same rate as when the system runs the game at 120 fps (i.e., each clock of the system has the same frequency as during execution of the game at 120 fps), but with lengthened vertical blanking intervals (between assertion of the last pixel of each field or frame and assertion of the first pixel of the next field or frame of the video data) thereby generating frames of the video data at the selected, reduced frame rate (e.g., 60 fps, 40 fps, or 30 fps). Thus, when operating at a reduced frame rate of 30 fps (where the maximum frame rate is 60 fps) GPU 2 could enter an active state for T seconds (where T=1/60) during which it generates a frame of data, then enter an idle state for T seconds, then enter an active state for T seconds to generate the next frame of data, and then enter another idle state for T seconds, and so on.

More generally, the driver software causes CPU 4 and GPU 2 to respond to a command to run a game program at a reduced frame rate (e.g., 60 fps, 30 fps, or 40 fps) by entering a mode in which GPU 2 generates (and asserts to display device 10) pixels of video data at the same pixel rate as when the system runs the game at the maximum frame rate (e.g., 120 fps) in the sense that each clock of the system has the same frequency during execution of the game at 120 fps as during execution of the gate at the reduced frame rate, but with idle intervals between assertion of subsets of the pixels (e.g., between lines, blocks of lines, fields, or frames of the data), thereby generating frames of the video data at the selected, reduced frame rate (e.g., 60 fps, 40 fps, or 30 fps). During each idle interval (e.g., each lengthened vertical blanking interval), GPU 2 consumes very low power (e.g., it is idle, and consumes only the small amount of power needed for logic circuitry to count to the end of the idle interval and trigger the rendering of the next subset of the data).

In variations on the described embodiment, the user selects the frame rate (at which the system operates while executing a game program) using hardware rather than software, such as by actuating one or more switches.

Another device-level power management technique is device clock control. As previously described, device clocks have a more global scope than subsystem clocks. A device clock originates at the root of a clock tree (typically a PLL, such as PLL 25, 26, or 27 of FIG. 1) and extends to the flip-flops that it services (e.g., flip-flops in the relevant one or ones of subsystems 16, 18, 20, and 22). For control of a device clock, a device typically includes one or more of the following features: device clock generation circuitry (e.g., PLL 27) that is controllable in response to a status signal from each relevant subsystem), a multiplexer (e.g., multiplexer 47) that is controllable to allow the host clock to be selected onto the clock tree (in substitution for the device clock), a buffer tree to distribute the device clock to the relevant subsystems, and one or more subsystem clocks, each of which is a branch of the device clock extending to the clock-driven circuitry (e.g., flip-flops) of at least one of the subsystems.

Even when a subsystem clock is disabled through subsystem power management (e.g., by assertion of a control signal indicative of a logical zero to AND gate 36), a device clock can still consume power through its device clock generation circuitry and through the portion of the device clock tree up to the branches of the tree at which the subsystem clock originates.

Preferably, system software (i.e., CPU 4, programmed with system software) configures control unit 12 to operate in any selected one of a number of different device-level power management modes for controlling each device clock. For example, in a class of embodiments, register array 12A of control unit 12 (or other circuitry of device 2 that is accessible by control unit 12) includes a four-bit host register (called a "PM_DEVICE_CONTROL" register) for each device clock generation circuit (e.g., each of PLLs 25, 26, and 27). System software can write a four-bit word to each "PM_DEVICE_CONTROL" register to indicate one of three power management modes for controlling the corresponding device clock (a mode in which the device clock generation circuit is powered-on and driving its clock tree, a second mode in which the device clock generation circuit is powered-on yet unused in its clock tree in deference to the host clock, and a third mode in which the device clock generation circuit is powered-down and unused in its clock tree in deference to the host clock). For convenience, the PM_DEVICE_CONTROL registers for all device clocks can be aggregated into a physically contiguous array of registers or a single larger register (e.g., a 32-bit register, when device 2 includes five device clock generation PLLs). Control unit 12 decodes the four-bit word in each PM_DEVICE_CONTROL register as follows:

| Value | Name of Mode | Definition of Mode |
|---|---|---|
| 0 | DCFULLPOWER | No power management is performed on the device clock. The device clock generation circuit (if present) is enabled and driving the clock tree. DCFULLPOWER is typically the default setting for each device clock. |
| 1 | BYPASS | The device clock generation circuit (if present) is enabled, but the host clock is selected to drive the device clock's clock tree. |
| 2 | RESERVED | Results are device-specific. |
| 3 | DCSUSPENDED | The device clock generation circuit (if present) is disabled, and the host clock is selected to drive the device clock's clock tree. |
| 4-F | RESERVED | Results are device-specific. |

In a variation on the described BYPASS mode, control unit 12 is configured to enable the device clock generation circuit (if present) and to select the device clock to drive the device clock tree when status signals (from the relevant ones of the subsystems) indicate that at least one subsystem (containing circuitry to be driven by the device clock, or a subsystem clock derived from the device clock) is not idle, and otherwise to enable the device clock generation circuit and select the host clock to drive the device clock tree.

Another device-level power management technique is host clock management. In conventional laptop computer systems that include a graphics device, the graphics device typically has a hardware "suspend" pin, to which the CPU (or other system element) can assert a control signal which guarantees to the graphics device that its services are not required and that it can completely power-down with no adverse affects. Without such a guarantee, there is typically no mechanism for the graphics device to determine when it can safely power-down. For example, since the device's host slave unit and any registers available across the host control bus must remain available at all times absent a guarantee from the system that they are not needed, the device cannot safely power-down its circuitry for responding to a slave access until the hardware suspend pin is asserted.

The system of FIG. 1 implements host clock management without the need for graphics device 2 to have a dedicated hardware suspend pin. Rather, control unit 12 is preferably configurable, in response to bits written by CPU 4 (programmed with system software) in the following manner to registers of device 2, to operate in any selected one of at least two different host clock management modes. For example, in a class of embodiments, register array 12A of control unit 12 (or other circuitry in device 2 that is accessible by control unit 12) includes at least one register (e.g., an eight-bit host register called a "PM_HOST_CONTROL" register) to which system software can write control bits (via host slave unit 15 and host control bus 11) to indicate the host clock management mode. In implementations in which such host register is an eight-bit "PM_HOST_CONTROL" register, control unit 12 decodes the eight-bit word in the PM_HOST_CONTROL register as follows:

| Value | Name of Mode | Definition of Mode |
|---|---|---|
| 0 | HCFULLPOWER | No power management is performed on the host clock. The host clock generation circuitry (if present) is enabled and driving the host clock tree. HCFULLPOWER is typically the default setting. |
| 1–6 | RESERVED | Results are device-specific. |
| 7 | HCSUSPENDED | All of the circuitry for generating device clocks is disabled (i.e. all device clock trees are disabled at their roots) and the circuitry for generating the host clock is also disabled (i.e. the host clock tree is disabled at its root). The device's control unit (e.g., control unit 12) is optionally configured to shut off (or decouple from the device) the power source (or any sources of static power) for the device upon entry into the "Suspended" mode. Shutting off the device's power supply or decoupling it from the device will of course cause all device state to be lost. |
| 8-FF | RESERVED | Results are device-specific. |

Bits 31:8 are device-specific. These bits should be set to ZERO except for a device-specific purpose.

In implementing host clock management or device clock control, each host clock generation circuit and device clock generation circuit should be powered up and powered down appropriately. Because clock generation PLLs (in a graphics processing device) take time to acquire their set frequency and in order to avoid glitches or runt pulses on the clock waveforms generated by such PLLs, it is important to power-up and power-down such PLLs in a preferred sequence when altering the power management state of one or more device clocks or the host clock in accordance with the invention. The preferred sequence for powering-down a device clock PLL (in an implementation of device 2 of FIG. 1 including the above-mentioned PM_DEVICE_CONTROL registers) is as follows:

the initial state of control unit 12 is the DCFULLPOWER mode;

then, write control bits to the relevant PM_DEVICE_CONTROL register to cause control unit 12 to enter the BYPASS mode;

then, read the relevant PM_DEVICE_CONTROL register to ensure that the previous write has had sufficient time to take effect, e.g., ensuring that the relevant device clock tree (including the relevant one of multiplexers 45, 46, and 47) has properly switched to the host clock; and then, write control bits to the relevant PM_DEVICE_CONTROL register to cause control unit 12 to enter the DCSUSPENDED mode (in which it disables the relevant device clock generation PLL, while continuing to assert the host clock to drive the relevant device clock tree).

The preferred sequence for powering-up a device clock PLL (in an implementation of device 2 of FIG. 1 including the above-mentioned PM_DEVICE_CONTROL registers) is as follows:

the initial state of control unit 12 is the DCSUSPENDED mode;

then, write control bits to the relevant PM_DEVICE_CONTROL register to cause control unit 12 to enter the BYPASS mode;

then wait for the relevant device clock generation PLL to power-up and lock (the lock time is device-specific); and then, write control bits to the relevant PM_DEVICE_CONTROL register to cause control unit 12 to enter the DCFULLPOWER mode.

The power-up and power-down sequences for the host clock generation circuit (e.g., PLL 24 of FIG. 1) are preferably managed by hardware mechanisms in response to the writing of appropriate control bits to the PM_HOST_CONTROL register (to cause control unit 12 to enter the HCFULLPOWER and HCSUSPENDED mode respectively). The system should be implemented so as not to attempt to access the device (e.g., device 2) across the system bus until the host clock generation circuit (e.g., PLL 24) has had sufficient time to lock after the appropriate control bits are written to device 2 to cause power-up of said host clock generation circuit.

Other device-level power management techniques are dynamic supply voltage management and device clock frequency management. To implement supply voltage management, control unit 12 of device 2 is implemented to control external voltage regulator 14 as described above. Typically, control unit asserts a control signal to voltage regulator 14 (to select one of the available set points of regulator 14) in response to a control signal asserted to control unit from CPU 4 (via system bus 5, host slave unit 15, and host control bus 11). Thus, a user can cause the system software to implement a user-specified trade-off between device performance and power consumption. For example, if coarse granularity of the supply voltage is sufficient, device 2 and regulator 14 can be implemented to support just three voltage levels: a nominal-voltage level (e.g., volts), a low-voltage level (e.g., 1.0 volt), and a high-voltage (high-performance) level (e.g., 1.5 volts). Preferably, no device state is lost when device 2 operates at any of the available voltage settings. Optionally, control unit 12 and regulator 14 are implemented so that system software can cause control unit 12 to disable device 2's power supply entirely (or system software can directly disable device 2's power supply) when device 2 enters a "suspended" state, in which case device 2 will lose its state.

Each device that embodies the invention will have a maximum clock frequency for each supported voltage level for each device clock. System software must respect these limits whenever causing a change in the supply voltage level for the device. Typically, when transitioning from a higher supply voltage to a lower supply voltage, the device clock (and host clock) frequencies should be adjusted downward and the clock generation circuitry should be given adequate time to lock to the new frequencies before the voltage is actually changed. Typically, when transitioning from a lower voltage to a higher voltage, the device clock (and host clock) frequencies should be adjusted upward after the voltage has been changed.

In a preferred implementation, a host register in control unit 12 (e.g., a 32-bit register known as a "PM_CORE_VOLTAGE_CONTROL" register) determines the control signals asserted by control unit 12 to control the voltage level of regulator 14. The mappings from the value in that register to one of the available voltage levels and the associated device clock (and host clock) frequencies are device-specific.

Another of the power management techniques implemented in preferred embodiments of the invention is peak power management. System designers must consider the maximum power dissipation of each device to determine an appropriate strategy for heat removal. Space considerations for mobile computing systems limit the options for heat removal. Conventionally, determination of the maximum power dissipation for a device requires finding or writing a worst-case software application. Unfortunately, such an application is often contrived and can dissipate considerably more power than the worst likely (or "real") application. However, although the application is contrived, the system's thermal design must still respect it.

Preferably, peak power management in accordance with the invention is designed to artificially limit the peak power drawn by a device to a pre-determined thermal design point by dynamically lowering device clock (and host clock) frequencies and/or reducing the supply voltage in the event that power dissipation by a device rises beyond a predetermined threshold. For example, the threshold can be set to correspond (at least approximately) to the power dissipation in the worst "real" application, Alternatively, for systems with more stringent thermal requirements, the threshold can be a lower level of power dissipation.

Preferably, a system including a graphics processing device (e.g., device 2 of FIG. 1) and a liquid crystal display (a liquid crystal display implementation of display 10 of FIG. 1) implements display interface frequency management in accordance with the invention as follows. The system is configured to operate in at least two modes: a mode in which the display is refreshed (by asserting a frame of image data to the display) at a normal rate, Rn (e.g., Rn=60 frames per second); and a second mode in which the display is updated at a reduced rate Rr (e.g., Rr=40 frames per second). It is especially desirable to implement the system with this capability where the cells of the display require a minimum time, T, to change state, where T is greater than $(Rn)^{-1}$ but less than $(Rr)^{-1}$.

Preferably, a system including a graphics processing device (e.g., device 2 of FIG. 1) and a backlit display (an implementation of display 10 of FIG. 1 including a backlight and circuitry for providing power to the backlight in response to control signals from at least one of CPU 4 and GPU 2) implements backlight intensity management in accordance with the invention as follows. The system is configured to drive the display's backlight with any of at least two predetermined duty cycles (and preferably with any of a large number of predetermined duty cycles). The power consumption of the backlight (as well as the time-averaged brightness of the light emitted thereby) is reduced by reducing the duty cycle of the signal that provided power thereto.

Other power management techniques that can be implemented in some embodiments of the invention include:

1. fine-grained automatic clock gating. As described above, clock gating (i.e., control of the circuitry to which device clocks or subsystem clocks are asserted, e.g. using AND gates 30, 32, 34, 36, 38, 40, and 42 of FIG. 1) is one of the primary techniques used in accordance with the invention to manage power. In the embodiments described above, the subsystem level (selective assertion of subsystem clocks) is the lowest level of granularity for clock gating. However, in other embodiments, significant savings, both in peak power and in average power, can be achieved by gating clocks at a finer granularity (i.e., at a level below the subsystem level). For example, a typical subsystem of a device has many load-enable flip-flops. Where multiple flip-flops share the same load-enable, in a data path for example, gating the clock with the load-enable to a bank of registers (independently of gating each subsystem clock asserted to other circuitry of the subsystem) can reduce the average power consumption of the subsystem (below the average power consumption achievable with subsystem level clock gating);

2. Synthesis optimizations. There are several classes of optimizations available during the process of designing a device (e.g., during the synthesis process or during the RTL development process) that can yield lower-power equivalent implementations of a device. Two such classes of optimization are gate-level optimization and operand isolation. Gate-level optimization denotes the rearrangement of logic to reduce the overall amount of switching that occurs during operation of the device. Operand isolation denotes the prevention of switching of operands when they are not in use, and is a technique that can be particularly effective in a data path design;

3. Use of low-power flip-flops in a device. It has been estimated that approximately 50% of the power consumption of a typical class of graphics chips occurs in the clock tree. By replacing all flip-flops of a device whose timing is not critical, with low-power (lower-performance) flip-flops during the physical design process, a significant power savings can be realized;

4. Leakage current in deep sub-micron technology. As devices are implemented with reduced size, leakage currents will increase dramatically. For example, leakage currents in 0.13 $\mu$m technology are typically as much as ten times those occurring with 0.15 $\mu$m technology. Leakage current is particularly significant during a very low power consumption mode (e.g., a suspend mode) of a device (e.g., a device included in a laptop computer system), if the system including the device does not entirely disable the power to the device during such mode. Thus, it may be desirable to design and implement a device to have reduced leakage current, especially if it is expected that power to the device will not be entirely disabled during suspend mode operation.

In order to illustrate advantages attainable by implementing the invention, the following section describes a typical usage pattern of a laptop computer that embodies the invention, highlighting the relationship between the modes of use and the state of the power management system. The example will consider a series of activities starting with a marketing manager preparing a PowerPoint presentation (consuming power equal to 1.5 watts), then playing a video game (consuming power equal to 3 watts), reengaging with PowerPoint (1.5 watt consumption), then leaving the screen idle (consuming power equal to 0.5 watt) until the laptop blacks the screen and enters a suspend state (consuming no more than an insignificant amount of power).

Since the hardware architecture of the inventive device and system (e.g., those embodiments described herein with reference to FIG. 1) does not dictate the relationship between system activity and device power management, system software is free to define those relationships as it sees fit. The following example assumes one possible mapping between system activity and the functionality of a device implementing the invention. It should be appreciated that other mappings are possible at the discretion of system software.

In order to appreciate the benefit from the various power savings techniques implemented in accordance with the invention, it is important to understand the parameters that contribute to power consumption. A simple model of power consumption, sufficient for purposes of this example, is given by the following equation:

$$P = C * V^{2} * F$$

where

P is the power consumed by a device,

C is a capacitance characterizing the device,

V is the voltage applied (by the power supply for the device) across the device (or portion of the device) operating in response to a clock, and F is clock frequency.

The capacitance C is invariant for any specific implementation, leaving voltage and clock frequency as the parameters to be optimized in accordance with the invention.

The above-mentioned example illustrates how the these parameters are optimized in accordance with the invention to fit the system's mode of operation. While the marketing manager is preparing his PowerPoint presentation, the graphics device of his computer system is in its normal operating state: the voltage and clock frequencies are set to their nominal levels, the device is managing the subsystem clock enables for the subsystems of the device (based on the activity of each subsystem), and all clocks are enabled. Typically, the graphics device would have five or more device clocks—a core clock, a memory clock, video clocks for two heads, and a TV clock. In the example, the core clock, memory clock, and first head's video clock are certainly enabled during preparation of the PowerPoint presentation, although it is likely that the second head's video clock and the TV clock are disabled because their corresponding subsystems are not in use. Furthermore, those clocks that are enabled at the device level will be disabled at the subsystem level when not in use. For example, while the marketing manager is considering what his next slide should portray, thus leaving the graphics subsystem temporarily idle, the subsystem clock for the graphics subsystem will automatically be disabled to reduce power consumption.

When the marketing manager launches into the video game, the device is placed into its high-performance mode: the voltage V applied across the device core is raised to its high-performance level and the core clock frequency is increased accordingly (a higher core voltage allows a higher core clock frequency). Upon exiting the video game, the core voltage and core clock frequency revert back to their nominal levels.

When the manager stops work, leaving the system's screen idle, the device enters a low-power state by reducing the core voltage and lowering the core clock and memory clock frequencies accordingly. Finally, the system goes into a suspend mode, which disables all clocks (except the host clock, ensuring that the device can still respond to requests from the system using circuitry clocked by the host clock). Ultimately, when system software causes assertion of an appropriate signal to one or more host registers of the device (or assertion of a signal to a hardware suspend pin of the device), the host clock and any sources of static power are disabled so that the entire device is quiescent.

This simple example has included many of the dynamic power management techniques available through the inventive architecture. For example, in the example, the device automatically manages subsystem level clocking to match activity of each subsystem, system software manages clock frequencies and voltage levels to match application requirements, and all significant power consumption mechanisms, including generation of the host clock, can be shut off when the system enters a deep suspend state.

It should be understood that while certain forms of the invention have been illustrated and described herein, the invention is not to be limited to the specific embodiments described and shown or the specific methods described.

What is claimed is:

1. A processing device, including:

at least two subsystems, including a first subsystem and a second subsystem;

subsystem clock circuitry including at least a first subsystem clock branch coupled and configured to assert a first subsystem clock to the first subsystem and a second subsystem clock branch coupled and configured to assert a second subsystem clock to the second subsystem; and control circuitry coupled to the subsystem clock circuitry, wherein the control circuitry and the subsystem clock circuitry are configured to operate in a subsystem clock management mode in which the control circuitry prevents the first subsystem clock branch from asserting the first subsystem clock to the first subsystem when said first subsystem is idle, and the control circuitry prevents the second subsystem clock branch from asserting the second subsystem clock to the second subsystem when said second subsystem is idle; and wherein the control circuitry is further configured to cause either of the first or second subsystems to respond to an access even though the first or second subsystem is idle.

2. The device of claim 1, wherein the control circuitry is coupled to the first subsystem, the first subsystem is configured to assert to the control circuitry a status signal indicative of whether said first subsystem is idle, the first subsystem clock branch includes logic circuitry having a first state allowing assertion of the first subsystem clock to the first subsystem and a second state preventing assertion of the first subsystem clock to the first subsystem, and the control circuitry is configured to assert a control signal to the logic circuitry in response to the status signal, wherein the control signal selects the first state when the status signal does not indicate that the first subsystem is idle and the control signal selects the second state when the status signal indicates that the first subsystem is idle.

3. The device of claim 1, wherein said device is an integrated circuit.

4. The device of claim 1, wherein said device is a graphics processing portion of an integrated circuit.

5. The device of claim 1, also including:
device clock generation circuitry configured to generate at least a first device clock, wherein the device clock generation circuitry is coupled to the subsystem clock circuitry, the first subsystem clock branch asserts the first subsystem clock to the first subsystem in response to the first device clock, the second subsystem clock branch asserts the second subsystem clock to the second subsystem in response to the first device clock, and the control circuitry and the device clock generation circuitry are configured to operate in a device clock management mode in which the control circuitry selectively disables and enables generation of the first device clock by the device clock generation circuitry.

6. The device of claim 5, wherein the control circuitry in the device clock management mode causes the device clock generation circuitry to disable generation of the first device clock when both the first subsystem and the second subsystem are idle.

7. The device of claim 1, wherein the control circuitry is also configured to operate in a peak power management mode, wherein when the control circuitry is in the peak power management mode, the control circuitry dynamically causes the frequency of at least one clock asserted at at least one node of the device to be lowered whenever power consumption by the device rises to a predetermined threshold.

8. The device of claim 1, also including:
a voltage regulator coupled to the device and configured to assert a supply voltage to the device,
wherein the control circuitry is configured to operate in a peak power management mode, wherein when the control circuitry is in the peak power management mode, the control circuitry asserts a voltage control signal to the voltage regulator when power consumption by the device rises to a predetermined threshold, and the voltage regulator responds to said voltage control signal by operating in such a manner that the supply voltage is reduced to a predetermined value.

9. A processing device, including:
at least two subsystems, including a first subsystem and a second subsystem;
subsystem clock circuitry including at least a first subsystem clock branch coupled and configured to assert a first subsystem clock to the first subsystem and a second subsystem clock branch coupled and configured to assert a second subsystem clock to the second subsystem; and
control circuitry coupled to the subsystem clock circuitry, wherein the control circuitry and the subsystem clock circuitry are configured to operate in a subsystem clock management mode in which the control circuitry prevents the first subsystem clock branch from asserting the first subsystem clock to the first subsystem when said first subsystem is idle, and the control circuitry prevents the second subsystem clock branch from asserting the second subsystem clock to the second subsystem when said second subsystem is idle;
multiplexing circuitry having inputs coupled to a first node at which a host clock is asserted and a second node at which a first device clock is asserted, and having at least one output coupled to the subsystem clock circuitry,
wherein the control circuitry and the multiplexing circuitry are configured to operate in a mode in which the control circuitry causes the multiplexing circuitry to assert a selected one of the host clock and the first device clock to the subsystem clock circuitry, and wherein the first subsystem clock branch asserts the first subsystem clock to the first subsystem in response to said selected one of the host clock and the first device clock, and the second subsystem clock branch asserts the second subsystem clock to the second subsystem in response to said selected one of the host clock and the first device clock.

10. A processing device, including:
at least two subsystems, including a first subsystem and a second subsystem;
subsystem clock circuitry including at least a first subsystem clock branch coupled and configured to assert a first subsystem clock to the first subsystem and a second subsystem clock branch coupled and configured to assert a second subsystem clock to the second subsystem; and
control circuitry coupled to the subsystem clock circuitry, wherein the control circuitry and the subsystem clock circuitry are configured to operate in a subsystem clock management mode in which the control circuitry prevents the first subsystem clock branch from asserting the first subsystem clock to the first subsystem when said first subsystem is idle, and the control circuitry prevents the second subsystem clock branch from asserting the second subsystem clock to the second subsystem when said second subsystem is idle;
a host slave bus, wherein each of the first subsystem and the second subsystem includes a host register connected along the host slave bus; and
a host slave unit coupled to the host slave bus, and configured to be coupled to a system bus so as to provide an interface between the system bus and the host slave bus.

11. The device of claim 9, also including:
host clock generation circuitry configured to generate a host clock;
device clock generation circuitry configured to generate at least one device clock including a first device clock; and
multiplexing circuitry having inputs coupled to the host clock generation circuitry and the device clock generation circuitry, and having at least one output coupled to the subsystem clock circuitry,
wherein the control circuitry and the multiplexing circuitry are configured to operate in a mode in which the control circuitry causes the multiplexing circuitry to assert a selected one of the host clock and the first device clock to the subsystem clock circuitry, and wherein the first subsystem clock branch asserts the first subsystem clock to the first subsystem in response to said selected one of the host clock and the first device clock, and the second subsystem clock branch asserts the second subsystem clock to the second subsystem in response to said selected one of the host clock and the first device clock.

12. The device of claim 10, wherein the device is configured to be coupled to a voltage regulator so as to receive a supply voltage generated by the voltage regulator, the control circuitry is coupled to the host slave bus, and the control circuitry is configured to operate in a power management mode in response to a control signal received over the host slave bus, wherein when the control circuitry is in the power management mode, said control circuitry asserts a voltage control signal capable of setting the supply voltage to a predetermined value.

13. A graphics processing device, including:
at least two subsystems, including a first subsystem and a second subsystem;
subsystem clock circuitry including at least a first subsystem clock branch coupled and configured to assert a first subsystem clock to the first subsystem and a second subsystem clock branch coupled and configured to assert a second subsystem clock to the second subsystem;
multiplexing circuitry having inputs coupled to a first node at which a host clock is asserted and a second node at which a first device clock is asserted, and having at least one output coupled to the subsystem clock circuitry;
control circuitry coupled to the subsystem clock circuitry and to the multiplexing circuitry;
a host slave bus, wherein each of the first subsystem and the second subsystem includes a host register connected along the host slave bus; and
a host slave unit coupled to the host slave bus, and configured to be coupled to a system bus so as to provide an interface between the system bus and the host slave bus,
wherein the control circuitry includes a host register array connected along the host slave bus, the control circuitry is configured to operate in a subsystem clock management mode in response to a first set of control bits in a first host register of the host register array, and the control circuitry is configured to operate in a device clock management mode in response to a second set of control bits in a second host register of the host register array.

14. The device of claim 13, wherein when the control circuitry operates in the subsystem clock management mode, the control circuitry prevents the first subsystem clock branch from asserting the first subsystem clock to the first subsystem when said first subsystem is idle, and the control circuitry prevents the second subsystem clock branch from asserting the second subsystem clock to the second subsystem when said second subsystem is idle.

15. The device of claim 14, wherein when the control circuitry operates in the subsystem clock management mode, the control circuitry causes the multiplexing circuitry to assert the first device clock to the subsystem clock circuitry, so that the first device clock is asserted to the first subsystem clock branch and to the second subsystem clock branch.

16. The device of claim 14, wherein when the control circuitry operates in the device clock management mode,
the control circuitry causes the multiplexing circuitry to assert the host clock to the subsystem clock circuitry, so that the host clock is asserted to the first subsystem clock branch and to the second subsystem clock branch.

17. The device of claim 16, also including:
device clock generation circuitry configured to operate in a mode in which it generates the first device clock and asserts said first device clock to said second node,
and wherein when the control circuitry operates in the device clock management mode, the control circuitry causes the device clock generation circuitry to disable generation of the first device clock.

18. The device of claim 14, wherein the control circuitry is coupled to the first subsystem, the first subsystem is configured to assert to the control circuitry a status signal indicative of whether said first subsystem is idle, the first subsystem clock branch includes logic circuitry having a first state allowing assertion of the first subsystem clock to the first subsystem and a second state preventing assertion of the first subsystem clock to the first subsystem, and the control circuitry is configured to assert a control signal to the logic circuitry in response to the status signal during the subsystem clock management mode, wherein the control signal selects the first state when the status signal does not indicate that the first subsystem is idle and the control signal selects the second state when the status signal indicates that the first subsystem is idle.

19. The device of claim 13, wherein the control circuitry is configured to operate in a second device clock management mode in response to a third set of control bits in the second host register of the host register array.

20. The device of claim 19, also including:
device clock generation circuitry configured to operate in a mode in which it generates the first device clock and asserts said first device clock to said second node,
wherein when the control circuitry operates in the device clock management mode and in the second device clock management mode, the control circuitry causes the multiplexing circuitry to assert the host clock to the subsystem clock circuitry, so that the host clock is asserted to the first subsystem clock branch and to the second subsystem clock branch,
when the control circuitry operates in the device clock management mode, the control circuitry causes the device clock generation circuitry to disable generation of the first device clock, and
when the control circuitry operates in the second device clock management mode, the control circuitry allows the device clock generation circuitry to generate the first device clock.

21. The device of claim 13, wherein said device is an integrated circuit.

22. The device of claim 13, wherein said device is a graphics processing portion of an integrated circuit.

23. The device of claim 13, wherein the control circuitry is configured to operate in a power management mode in response to a third set of control bits in a third host register of the host register array, the device is configured to be coupled to a voltage regulator so as to receive a supply voltage generated by the voltage regulator, the control circuitry is coupled to the host slave bus, and the control circuitry is configured to operate in a power management mode in response to a control signal received over the host slave bus, and wherein when the control circuitry is in the power management mode, said control circuitry asserts a voltage control signal capable of setting the supply voltage to a predetermined value.

24. The device of claim 13, also including:
host clock generation circuitry coupled to the control circuitry and configured to operate in a mode in which it generates the host clock and asserts said host clock at said first node, wherein the control circuitry is configured to operate in a host clock management mode in response to a third set of control bits in a third host register of the host register array, wherein when the control circuitry is in the host clock management mode, the control circuitry causes the host clock generation circuitry to disable generation of the host clock.

25. The device of claim 13, wherein the control circuitry is configured to operate in a peak power management mode in response to a third set of control bits in a third host register of the host register array, wherein when the control circuitry is in the peak power management mode, the control circuitry causes the frequency of at least one clock asserted at at least one node of the device to be lowered whenever power consumption by the device rises to a predetermined threshold.

26. A system, including:

a system bus;

a CPU connected along the system bus; and a graphics processing device connected along the system bus, wherein the graphics processing device includes:

at least two subsystems, including a first subsystem and a second subsystem;

subsystem clock circuitry including at least a first subsystem clock branch coupled and configured to assert a first subsystem clock to the first subsystem and a second subsystem clock branch coupled and configured to assert a second subsystem clock to the second subsystem; and control circuitry-coupled to the subsystem clock circuitry, wherein the control circuitry and the subsystem clock circuitry are configured to operate in a subsystem clock management mode in which the control circuitry prevents the first subsystem clock branch from asserting the first subsystem clock to the first subsystem when said first subsystem is idle, the control circuitry prevents the second subsystem clock branch from asserting the second subsystem clock to the second subsystem when said second subsystem is idle; and wherein the control circuitry is further configured to cause either of the first or second subsystems to respond to an access even though the first or second subsystem is idle.

27. The system of claim 26, wherein the device also includes:

device clock generation circuitry configured to generate at least a first device clock, wherein the device clock generation circuitry is coupled to the subsystem clock circuitry, the first subsystem clock branch asserts the first subsystem clock to the first subsystem in response to the first device clock, the second subsystem clock branch asserts the second subsystem clock to the second subsystem in response to the first device clock, and the control circuitry and the device clock generation circuitry are configured to operate in a device clock management mode in which the control circuitry selectively disables and enables generation of the first device clock by the device clock generation circuitry.

28. The system of claim 26, also including:

at least one input device connected along the system bus, and wherein the CPU and the graphics processing device are configured to operate in a frame generation mode in which frames of image data are generated by the graphics processing device at a selected frame rate, where the selected frame rate is a selected one of a set of predetermined frame rates, and the CPU is configured to respond to control data asserted from the input device over the system bus by causing the device to enter the frame generation mode, where the control data determines the selected frame rate.

29. A system, including:

a system bus;

a CPU connected along the system bus; and a graphics processing device connected along the system bus, wherein the graphics processing device includes:

at least two subsystems, including a first subsystem and a second subsystem;

subsystem clock circuitry including at least a first subsystem clock branch coupled and configured to assert a first subsystem clock to the first subsystem and a second subsystem clock branch coupled and configured to assert a second subsystem clock to the second subsystem; and control circuitry coupled to the subsystem clock circuitry, wherein the control circuitry and the subsystem clock circuitry are configured to operate in a subsystem clock management mode in which the control circuitry prevents the first subsystem clock branch from asserting the first subsystem clock to the first subsystem when said first subsystem is idle, the control circuitry prevents the second subsystem clock branch from asserting the second subsystem clock to the second subsystem when said second subsystem is idle;

a host slave bus, wherein each of the first subsystem and the second subsystem includes a host register connected along the host slave bus; and a host slave unit coupled between the host slave bus and the system bus so as to provide an interface between the system bus and the host slave bus.

30. The system of claim 28, also including:

a voltage regulator coupled to the device and configured to assert a supply voltage to the device, wherein the control circuitry is coupled to the host slave bus, the control circuitry is configured to operate in a power management mode in response to a control signal received over the host slave bus, wherein when the control circuitry is in the power management mode, the control circuitry assets a voltage control signal to the voltage regulator, and the voltage regulator responds to said voltage control signal by operating in such a manner that the supply voltage has a predetermined value.

31. A system, including:

a system bus;

a CPU connected along the system bus; and a graphics processing device connected along the system bus, wherein the graphics processing device includes;

at least two subsystems, including a first subsystem and a second subsystem;

subsystem clock circuitry including at least a first subsystem clock branch coupled and configured to assert a first subsystem clock to the first subsystem and a second subsystem clock branch coupled and configured to assert a second subsystem clock to the second subsystem; and control circuitry coupled to the subsystem clock circuitry,
wherein the control circuitry and the subsystem clock
circuitry are configured to operate in a subsystem clock
management mode in which the control circuitry prevents the first subsystem clock branch from asserting
the first subsystem clock to the first subsystem when
said first subsystem is idle, the control circuitry prevents the second subsystem clock branch from asserting the second subsystem clock to the second subsystem when said second subsystem is idle;

host clock generation circuitry configured to generate a
host clock;

device clock generation circuitry configured to generate at
least one device clock including a first device clock;
and multiplexing circuitry having inputs coupled to the host
clock generation circuitry and the device clock generation circuitry, and having at least one output coupled to
the subsystem clock circuitry, wherein the control circuitry and the multiplexing circuitry are configured to operate in a mode in which the
control circuitry causes the multiplexing circuitry to
assert a selected one of the host clock and the first
device clock to the subsystem clock circuitry, and
wherein the first subsystem clock branch asserts the
first subsystem clock to the first subsystem in response
to said selected one of the host clock and the first device
clock, and the second subsystem clock branch asserts
the second subsystem clock to the second subsystem in
response to said selected one of the host clock and the
first device clock.

32. A system, including:

a system bus;

a CPU connected along the system bus; and a graphics processing device connected along the system
bus, wherein the graphics processing device includes:

at least two subsystems, including a first subsystem and a
second subsystem;

subsystem clock circuitry including at least a first subsystem clock branch coupled and configured to assert a
first subsystem clock to the first subsystem and a
second subsystem clock branch coupled and configured
to assert a second subsystem clock to the second
subsystem;

multiplexing circuitry having inputs coupled to a first
node at which a host clock is asserted and a second
node at which a first device clock is asserted, and
having at least one output coupled to the subsystem
clock circuitry;

control circuitry coupled to the subsystem clock circuitry
and to the multiplexing circuitry;

a host slave bus, wherein each of the first subsystem and
the second subsystem includes a host register connected along the host slave bus; and a host slave unit coupled to the host slave bus, and
configured to be coupled to a system bus so as to
provide an interface between the system bus and the
host slave bus, wherein the control circuitry includes a host register array
connected along the host slave bus, the control circuitry
is configured to operate in a subsystem clock management mode in response to a first set of control bits in a
first host register of the host register array, and the
control circuitry is configured to operate in a device
clock management mode in response to a second set of
control bits in a second host register of the host register
array.

33. The system of claim 32, wherein when the control
circuitry operates in the subsystem clock management
mode, the control circuitry prevents the first subsystem
clock branch from asserting the first subsystem clock to the
first subsystem when said first subsystem is idle, and the
control circuitry prevents the second subsystem clock
branch from asserting the second subsystem clock to the
second subsystem when said second subsystem is idle.

34. The system of claim 32, wherein when the control
circuitry operates in the device clock management mode, the control circuitry causes the multiplexing circuitry to
assert the host clock to the subsystem clock circuitry, so
that the host clock is asserted to the first subsystem
clock branch and to the second subsystem clock
branch.

35. The system of claim 34, also including:

device clock generation circuitry configured to operate in
a mode in which it generates the first device clock and
asserts said first device clock to said second node, and wherein when the control circuitry operates in the
device clock management mode, the control circuitry
causes the device clock generation circuitry to disable
generation of the first device clock.

36. The system of claim 32, wherein the control circuitry
is configured to operate in a second device clock management mode in response to a third set of control bits in the
second host register of the host register array.

37. The system of claim 36, wherein the device also
includes:

device clock generation circuitry configured to operate in
a mode in which it generates the first device clock and
asserts said first device clock to said second node, wherein when the control circuitry operates in the device
clock management mode and in the second first device
generation mode, the control circuitry causes the multiplexing circuitry to assert the host clock to the subsystem clock circuitry, so that the host clock is asserted
to the first subsystem clock branch and to the second
subsystem clock branch, when the control circuitry operates in the device clock
management mode, the control circuitry causes the
device clock generation circuitry to disable generation
of the first device clock, and when the control circuitry operates in the second device
clock management mode, the control circuitry allows
the device clock generation circuitry to generate the
first device clock.

38. The system of claim 32, also including:

a voltage regulator coupled to the device and configured
to assert a supply voltage to the device, wherein the control circuitry is configured to operate in a
power management mode in response to a third set of
control bits in a third host register of the host register
array, wherein when the control circuitry is in the
power management mode, the control circuitry asserts
a voltage control signal to the voltage regulator, and the
voltage regulator responds to said voltage control signal by operating in such a manner that the supply
voltage has a predetermined value.

39. The system of claim 32, wherein the device also
includes:

host clock generation circuitry coupled to the control
circuitry and configured to operate in a mode in which
it generates the host clock and asserts said host clock at
said first node, wherein the control circuitry is configured to operate in a host clock management mode in response to a third set of control bits in a third host register of the host register array, wherein when the control circuitry is in the host clock management mode, the control circuitry causes the host clock generation circuitry to disable generation of the host clock.

40. The system of claim 32, wherein the control circuitry is configured to operate in a peak power management mode in response to a third set of control bits in a third host register of the host register array, wherein when the control circuitry is in the peak power management mode, the control circuitry causes the frequency of at least one clock asserted at at least one node of the device to be lowered whenever power consumption by the device rises to a predetermined threshold.

41. The system of claim 32, also including:

a voltage regulator coupled to the device and configured to assert a supply voltage to the device, wherein the control circuitry is configured to operate in a peak power management mode in response to a third set of control bits in a third host register of the host register array, wherein when the control circuitry is in the peak power management mode, the control circuitry asserts a voltage control signal to the voltage regulator when power consumption by the device rises to a predetermined threshold, and the voltage regulator responds to said voltage control signal by operating in such a manner that the supply voltage is reduced to a predetermined value.

42. The system of claim 32, also including:

at least one input device connected along the system bus, and wherein the CPU and the graphics processing device are configured to operate in a frame generation mode in which frames of Image data are generated by the graphics processing device at a selected frame rate, where the selected frame rate is a selected one of a set of predetermined frame rates, and the CPU is configured to respond to control data asserted from the input device over the system bus by causing the device to enter the frame generation mode, where the control data determines the selected frame rate.

43. A graphics processing device, including:

at least two subsystems, including a first subsystem and a second subsystem;

subsystem clock circuitry including at least a first subsystem clock branch coupled and configured to assert a first subsystem clock to the first subsystem and a second subsystem clock branch coupled and configured to assert a second subsystem clock to the second subsystem; and control circuitry coupled to the subsystem clock circuitry, wherein the control circuitry and the subsystem clock circuitry are configured to operate in a subsystem clock management mode in which the control circuitry prevents the first subsystem clock branch from asserting the first subsystem clock to the first subsystem when said first subsystem is idle, and the control circuitry prevents the second subsystem clock branch from asserting the second subsystem clock to the second subsystem when said second subsystem is idle;

a system bus;

a CPU connected along the system bus;

the graphics processing device being connected along the system bus; and at least one input device connected along the system bus, wherein the CPU and the graphics processing device are configured to operate in a frame generation mode in which frames of image data are generated by the graphics processing device at a selected frame rate, the selected frame rate is a selected one of a set of predetermined frame rates, and the CPU is configured to respond to control data asserted from the input device over the system bus by causing the device to enter the frame generation mode, where the control data determines the selected frame rate.

44. The device of claim 43, wherein the set of predetermined frame rates includes a maximum frame rate and a reduced frame rate, the graphics processing device generates-pixels of the image data at a first pixel rate when operating in the frame generation mode with the selected frame rate equal to the maximum frame rate, and the graphics processing device generates pixels of the image data at said first pixel rate but with idle time between generation of at least two subsets of the pixels when operating in the frame generation mode with the selected frame rate equal to the reduced frame rate.

45. The device as in claim 43, wherein the input device is user operated to select the frame rate from a plurality of frame rates.

46. The device as in claim 43, wherein at least one of the first subsystem clock and the second subsystem clock operate at a first frequency during each of the plurality of frame rates, the CPU controller, the GPU to alter a vertical blanking interval between subsets of pixels of a frame of video data, thereby altering the frame rate.

47. The system as in claim 28, wherein the input device is user operated to select the frame rate from a plurality of frame rates.

* * * * *

UNITED STATES PATENT AND TRADEMARK OFFICE
CERTIFICATE OF CORRECTION

PATENT NO. : 6,938,176 B1
DATED : August 30, 2005
INVENTOR(S) : Alben et al.

It is certified that error appears in the above-identified patent and that said Letters Patent is hereby corrected as shown below:

Column 18,
Line 49, replace "9" with -- 10 --.

Column 21,
Line 33, replace "circuitry-coupled" with -- circuitry coupled --.

Column 22,
Line 40, replace "28" with -- 29 --.

Column 25,
Line 37, replace "Image" with -- image --.

Column 26,
Line 31, replace "generates-pixels" with -- generates pixels --.

Signed and Sealed this

Twenty-ninth Day of November, 2005

JON W. DUDAS
*Director of the United States Patent and Trademark Office*